United States Patent
Hodges et al.

(10) Patent No.: US 9,807,315 B1
(45) Date of Patent: Oct. 31, 2017

(54) LOOKUP TABLE INTERPOLATION IN A FILM EMULATION CAMERA SYSTEM

(71) Applicant: Visual Supply Company, Oakland, CA (US)

(72) Inventors: Zachary Daniel Hodges, Walnut Creek, CA (US); Rohit Patil, Pleasanton, CA (US); Yuan Liu, Oakland, CA (US)

(73) Assignee: Visual Supply Company, Oakland, CA (US)

( * ) Notice: Subject to any disclaimer, the term of this patent is extended or adjusted under 35 U.S.C. 154(b) by 0 days.

(21) Appl. No.: 15/606,716

(22) Filed: May 26, 2017

Related U.S. Application Data

(63) Continuation of application No. 15/427,065, filed on Feb. 8, 2017, now Pat. No. 9,681,064, which is a continuation of application No. 15/331,868, filed on Oct. 23, 2016, now Pat. No. 9,602,739.

(51) Int. Cl.
| | |
|---|---|
| H04N 5/262 | (2006.01) |
| H04N 5/232 | (2006.01) |
| G06F 17/30 | (2006.01) |
| H04N 5/243 | (2006.01) |
| H04N 5/235 | (2006.01) |

(52) U.S. Cl.
CPC ....... *H04N 5/2621* (2013.01); *G06F 17/3028* (2013.01); *G06F 17/30952* (2013.01); *H04N 5/23216* (2013.01); *H04N 5/23293* (2013.01); *H04N 5/243* (2013.01)

(58) Field of Classification Search
CPC .. H04N 5/2621; H04N 5/2351; H04N 5/2353; H04N 5/23216; H04N 5/23293; G06F 17/30952; G06F 17/3028
See application file for complete search history.

(56) References Cited

U.S. PATENT DOCUMENTS

| | | | | |
|---|---|---|---|---|
| 5,641,596 A | * | 6/1997 | Gray | H04N 1/407 348/E5.049 |
| 6,072,464 A | * | 6/2000 | Ozeki | G09G 1/285 345/603 |
| 2007/0126744 A1 | | 6/2007 | Tsutsumi | |

(Continued)

OTHER PUBLICATIONS

United States Office Action, U.S. Appl. No. 15/427,065, dated Apr. 7, 2017, 10 pages.

*Primary Examiner* — Hung Lam
(74) *Attorney, Agent, or Firm* — Fenwick & West LLP

(57) ABSTRACT

An image capture and processing system accesses an image including image data. The image processing system receives a selection of a preset configuration. The preset configuration identifies first and second image effects, a first intensity value corresponding to the first image effect, and a second intensity value corresponding to the second image effect. The image processing system accesses a set of stored lookup tables (LUTs). Each accessed LUT in the set of stored LUTs is associated with the first and second image effects, and is associated with intensity values within a threshold proximity of the first and second intensity values. The image processing system generates a combined LUT by interpolating the accessed set of stored LUTs. The image processing system processes the image based on the combined LUT.

20 Claims, 4 Drawing Sheets

(56) References Cited

U.S. PATENT DOCUMENTS

| | | | |
|---|---|---|---|
| 2007/0165048 A1* | 7/2007 | Yamashita | G06T 5/009 345/601 |
| 2008/0198925 A1 | 8/2008 | Sayre | |
| 2010/0303351 A1 | 12/2010 | Umeda et al. | |
| 2011/0109581 A1 | 5/2011 | Ozawa et al. | |
| 2011/0150332 A1* | 6/2011 | Sibiryakov | G06T 5/004 382/167 |
| 2012/0251081 A1 | 10/2012 | Kawaguchi | |
| 2013/0314442 A1* | 11/2013 | Langlotz | G06T 19/006 345/633 |
| 2014/0192244 A1 | 7/2014 | Ishihara et al. | |

* cited by examiner

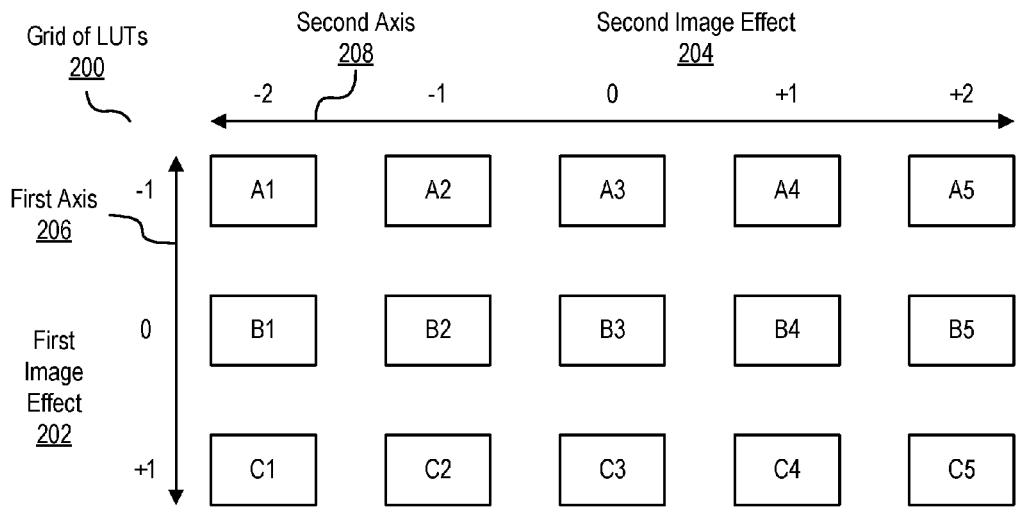
*FIG. 2A*
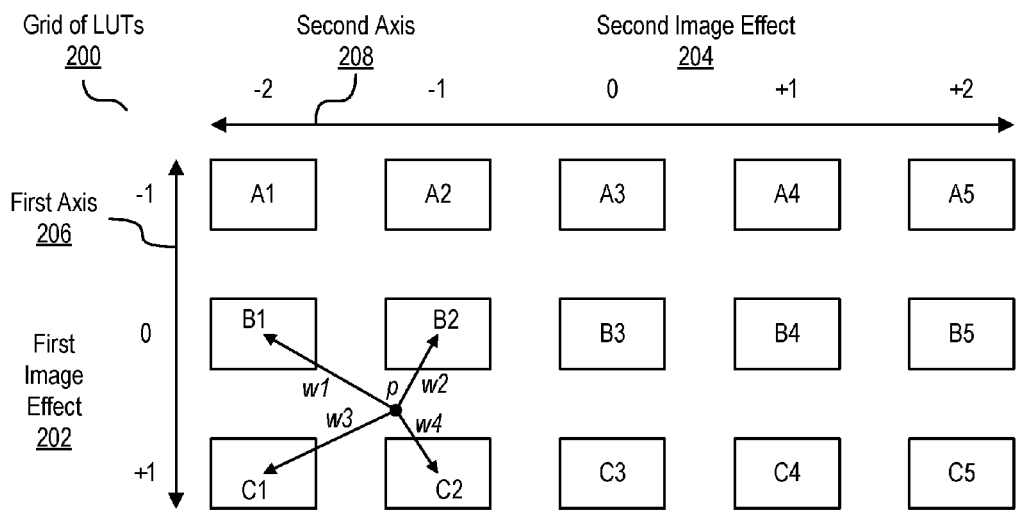
*FIG. 2B*
*FIG. 2C*

LOOKUP TABLE INTERPOLATION IN A FILM EMULATION CAMERA SYSTEM

CROSS REFERENCE TO RELATED APPLICATIONS

This application is a continuation of U.S. patent application Ser. No. 15/427,065, filed on Feb. 8, 2017, now U.S. Pat. No. 9,681,064, which application is a continuation of U.S. patent application Ser. No. 15/331,868, filed on Oct. 23, 2016, now U.S. Pat. No. 9,602,739, all of which is incorporated herein by reference in its entirety.

BACKGROUND

This disclosure relates generally to image processing, and more specifically, to the generation and application of lookup tables for use in emulating film effects in an image.

Mobile devices, such as phones and tablets, are becoming ubiquitous and an integral part of user's daily lives. Users carry mobile devices not only for communication in a traditional sense, but also as an all in one device—a personal phone, a music player, an internet browser, an interactive map, a camera, a journal, a social network interaction tool, and the like.

A typical mobile device includes a display, a camera and hardware for user input. The mobile device enables a user to capture and/or edit images. For example, the user of the mobile device may edit the images by applying one or more image effects. Limited resources (e.g., memory) of the mobile device may limit the number of image effects, or combinations thereof, that may be stored on the mobile device.

SUMMARY

Embodiments relate to a film emulation camera system configured to generate a combined lookup table (LUT) for use in processing captured images. An image including image data is captured or accessed. A selection of a preset configuration is received from a user of the film emulation system. The preset configuration identifies a first and a second image processing effect, a first intensity value corresponding to the first image processing effect, and a second intensity value corresponding to the second image processing effect. A set of stored LUTs associated with the first image processing effect and the second image processing effect is accessed. Each accessed LUT in the set of LUTs is associated with intensity values within a threshold proximity of the first and second intensity values. A combined LUT is generated by interpolating the accessed set of LUTs. The image is then processed using the combined LUT.

BRIEF DESCRIPTION OF THE DRAWINGS

Figure (FIG. 1 illustrates an example film emulation computing system for generating a combined lookup table, according to one embodiment.

FIG. 2A illustrates an example grid of lookup tables corresponding to combinations of intensity values for two image effects, according to one embodiment.

FIG. 2B illustrates an example preset configuration corresponding to a user input with respect to the grid of lookup tables of FIG. 2A, according to one embodiment.

FIG. 2C illustrates an example formula for generating a combined lookup table based on the preset configuration of FIG. 2B and with respect to the grid of lookup tables of FIG. 2A, according to one embodiment.

The figures depict various embodiments of the present disclosure for purposes of illustration only. One skilled in the art will readily recognize from the following discussion that alternative embodiments of the structures and methods illustrated herein may be employed without departing from the principles of the disclosure described herein.

DETAILED DESCRIPTION

Environment Overview

Figure 1:
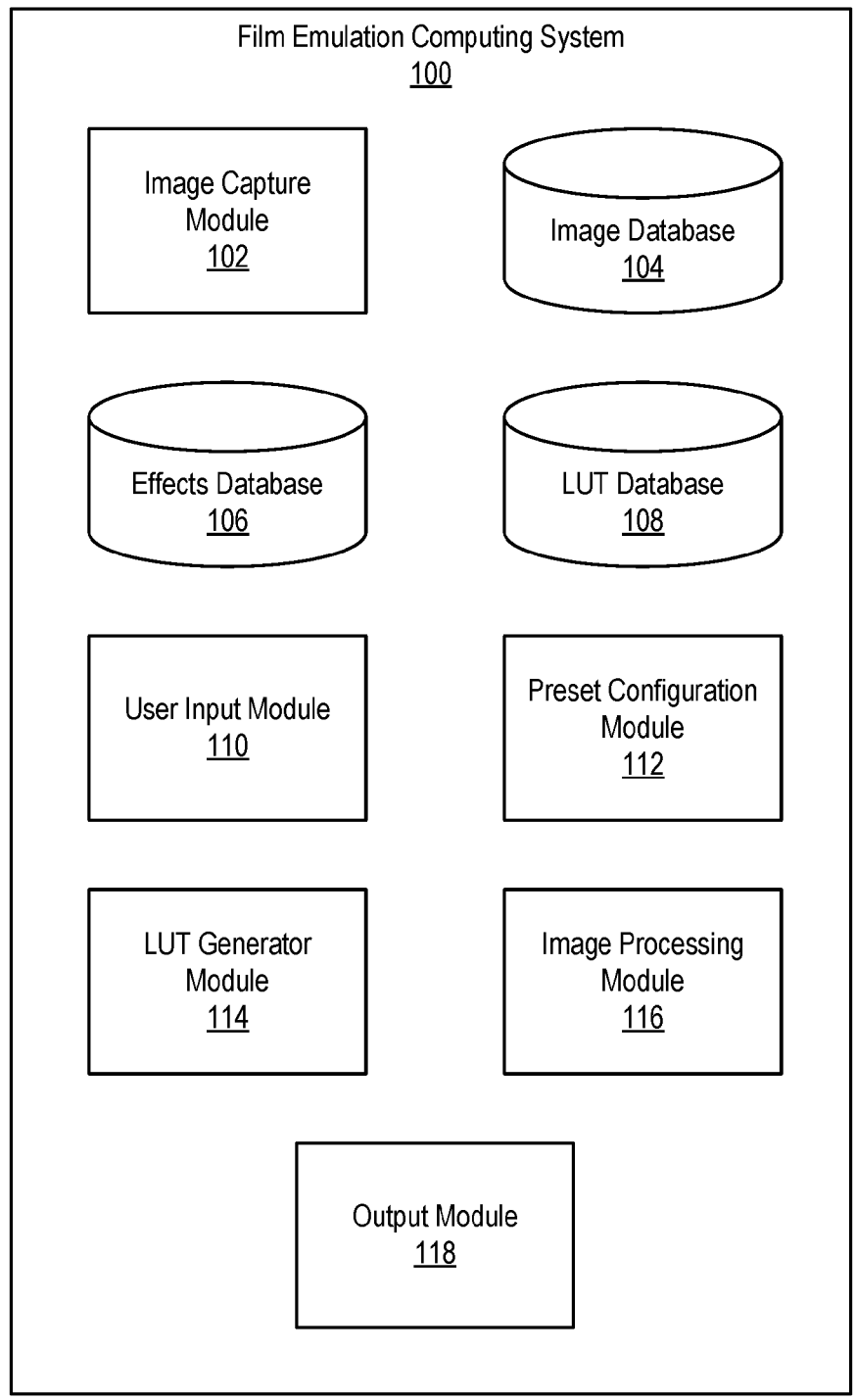

FIG. 1 illustrates an example film emulation computing system 100, according to one embodiment. The film emulation computing system (hereinafter referred to as "computing system 100") generates a combined lookup table (LUT) including information corresponding to a desired appearance of an image. The computing system 100 includes an image capture module 102, an image database 104, an effects database 106, a LUT database 108, a user input module 110, a preset configuration module 112, a LUT generator module 114, an image processing module 116, and an output module 118.

In some embodiments, the computing system 100 is implemented within a single device, such as a mobile phone, a tablet computer, a smart device, or any other suitable device that includes camera functionality, user interface functionality, and image processing functionality. In other embodiments, the components of the computing system 100 are implemented within two or more devices. For instance, the computing system 100 can include a camera device (such as a DLSR camera, a point-and-click camera, a mobile phone, and the like) that implements (for example) the image capture module 102, the image database 104 and an image processing device (such as a personal computer, a cloud server, a smart device, and the like) that implements (for example) the effects database 106, the LUT database 108, the user input module 110, the preset configuration module 112, the LUT generator module 114, the image processing module 116, and the output module 118. It should be noted that the remainder of the description will focus on embodiments in which the computing system 100 is implemented within a single device, though the principles described herein apply equally to embodiments where the computing system 100 is implemented across multiple devices.

The computing system 100 can include an application executing on the computing system 100 and configured to implement one or more of the functionalities described herein. For instance, the application can include camera functionality configured to enable a user to capture an image via the image capture module 102, can include user interface functionality configured to enable a user to interact with the application (for instance, to select one or more image processing options) via the user input module 110, and can include display functionality configured to show captured images (for instance, both pre- and post-processing) via a display of the computing system 100. In some embodiments, the computing system 100 can include multiple applications each configured to implement one or more of the functionalities of the computing system 100 (for instance, a first application dedicated to image capture and a second application dedicated to image processing) according to the principles described herein, though the remainder of the description will be limited to embodiments in which the functionalities of the computing system 100 are performed within the environment of a single application.

The image capture module 102 captures an image, for instance via camera hardware of the computing system 100. The captured image includes image data representative of a field of view of the camera hardware lens at the time of image capture, and may include a raw image format (e.g., .cr2, .dng, .nef, .sr2, and the like). The image capture module 102 stores the captured image in the image database 104. In some embodiments, the image capture module 102 encodes the image before storing it in the image database 104, or encodes the image at the time of capture (for instance, to show live previews of the encoding to the user).

It should be noted that although reference is made herein to the capture of an image for processing, in alternative configurations, instead of capturing an image, the image capture module 102 may access a previously captured and stored image (for instance, captured by the image capture module 102 itself or an external module, and stored in the image database 104). The previously captured and stored image may include a raw image format (e.g., .cr2, .dng, .nef, .sr2, and the like) or a processed image format (e.g., .tif, .jpg, .png, and the like). In some embodiments, the image is imported from a camera roll or photo album on a device implementing the computing system 100. For example, a user can import images from a cloud storage service such as GOOGLE DRIVE, SMUGMUG, DROBOX, BOX, and/or FLICKR. It should be noted that the image database 104 can store images captured or accessed by the image capture module 102, and can also store images processed by the computing system 100 (for instance, images processed by the image processing module 116 using a combined LUT generated by the LUT generator module 114).

The effects database 106 stores image effects that can be applied to the image. Examples of image effects include effects that emulate analog film and its interaction with film scanners, such as scanner warmth, scanner contrast, film exposure time, film age, film inter-channel effects, film spectral sensitivities, and other such film properties. Each image effect in the effects database 106 is associated with a range of intensity values. The range of intensity values may vary per image effect, and may be linearly distributed or non-linearly distributed. For example, some effects may have 5 associated linearly distributed intensity values (e.g., −2, −1, 0, +1, +2), whereas other effects may have 3 associated linearly distributed intensity values (e.g., −1, 0, +1).

As used herein, an intensity value for an image effect being applied to an image represents a magnitude of the image effect applied to the image during image processing. For instance, for the scanner warmth effect, an intensity value of "+2" may be associated with an application of the scanner warmth effect at twice the magnitude as an intensity value of "+1". Likewise, certain effects can be associated with negative magnitudes when applied to the image during image processing. For example, the scanner warmth effect can be positively applied to an image (e.g., image warmth is increased) or negatively applied to an image (e.g., image warmth is decreased). Thus, a positive intensity value for an image effect can be associated with an increase in magnitude of the image effect when applied to an image, and a negative intensity value for the image effect can be associated with a decrease in magnitude of the image effect when applied to the image.

The computing system 100 can process or encode images using one or more LUTs. Example LUTs include chrominance-type LUTs (such as color maps or palettes) that map each input value in a range of one or more input values to a particular output value. For instance, a first LUT can map a range of intensity values for red image components (such as red pixel values in a Bayer pixel array) to red output values, a second LUT can map a range of intensity values for blue image components to blue output values, and a third LUT can map a range of intensity values for green image components to green output values. By applying a chrominance LUT to an image, a user can beneficially adjust color components of the image in a way suitable to the user's liking. In addition to image chrominance, LUTs can map luminance input ranges to luminance output values. For example, for an image captured in low-light conditions, a luminance LUT configured to amplify image luminance can be applied in order to better show dark objects within the image. In some embodiments, LUTs, when applied to an image, can apply a combination of chrominance effects, luminance effects, and/or any other design image effects.

The LUT database 108 stores LUTs used to process/encode images. Each LUT stored within the LUT database 108 corresponds to at least one image effect, for instance scanner warmth, film exposure time, and the like. Further, each LUT stored in the LUT database 108 is associated with an intensity value associated with each corresponding image effect. For instance, for a LUT associated with both the scanner warmth effect and the film exposure time effect, the LUT can be associated with an intensity value of "+2" for scanner warmth and an intensity value of "−1" for exposure time. Accordingly, when an image is processed using such a LUT, the resulting processed image can be equivalent or similar to an image that is processed with a first LUT associated with the scanner warmth effect and an intensity value of "+2", and then subsequently processed with a second LUT associated with the film exposure time effect and an intensity value of "−1". In some embodiments, the LUT database 108 includes a LUT for every combination of two image effects stored in the effects database 106 and every combination of associated intensity values.

For example, if a first image effect (e.g., a scanner warmth effect) has 5 associated intensity values (e.g., −2, −1, 0, +1, +2) and a second image effect (e.g., a film exposure time effect) has 3 associated intensity values (e.g., −1, 0, +1), the LUT database 108 can store a first LUT corresponding to an intensity value of "−2" for the first image effect and "−1" for the second image effect, a second LUT corresponding to an intensity value of "−2" for the first image effect and "0" for the second image effect, and so on. Thus, in this example, the LUT database 108 stores a total of 15 LUTs for the first and second image effects, each LUT representing a desired appearance of the image for a combination of associated intensity values of the first and second image effects.

In some embodiments, the LUT database 108 stores a set of pre-determined LUTs, for instance LUTs stored by the computing system 100 or downloaded in conjunction with the downloading of an application running by the computing system 100. A user can subsequently access or download additional image effects (for storage in the effects database 106) and corresponding LUTs (for storage in the LUT database 108), for instance by purchasing one or more image effects, image filters, or image presets available through an application interface (such as a web store or native application purchase interface). In some embodiments, a user can create new image effects and/or LUTs for use in image processing, for instance via an image effect or LUT creation interface of the computing system 100, and such image effects and LUTs can be stored in the effects database 106 and the LUT database 108, respectively, for subsequent use in image processing via the image processing module 116.

The user input module 110 receives user inputs corresponding to a user's desired appearance of the image. For instance, a user can modify a captured image by applying one or more image effects to the image via an interface generated by the user input module 110 and displayed by the computing system 100. In some embodiments, a user can select two image effects to apply to an image, and can select associated intensity values for each image effect. The intensity values may be from a continuous range of intensity values. For example, associated intensity values for a first image effect may be selected from a continuous range [−2, 2] and associated intensity values for a second effect may be selected from a continuous range [−1, 1].

In some embodiments, the user input module 110 can display an intensity value range, for instance as a line segment representative of the intensity value range, and a user can select an intensity value from the intensity value range by touching or gesturing to a location on the displayed line segment. For instance, if the intensity value range is 0 to +2, a left portion of the displayed line segment can be associated with the value "0" and the right portion of the displayed line segment can be associated with the value "+2". Continuing with this example, if a user touches a point of the line segment one third of the distance along the line segment from the left portion of the line segment, the selected intensity value can be determined to be "+0.66" (one third of the range between "0" and "+2").

It should be noted that for LUTs associated with two image effects, each associated with an intensity value range, the user input module 110 can display a grid such that a first axis of the grid is associated with the intensity value range of the first image effect and the second axis of the grid is associated with the intensity value range of the second image effect. Thus, when a user touches a location on the displayed grid, intensity values can be determined based on the location on the grid relative to each axis. For instance, if the touched location on the grid is 80% along the first axis, the intensity value for the first image effect can be equivalent to the value 80% along the first intensity value range, and if the touched location is 20% along the second axis, the intensity value for the second image effect can be equivalent to the value 20% along the second intensity value range. It should also be noted that in some embodiments, the user input module 110 can enable other means of intensity value selection than those described herein, for instance by manual entry of intensity values for image effects using a hardware or displayed keyboard or keypad, using slider bars (e.g., one slider bar for each image effect), and the like.

The preset configuration module 112 generates and stores a preset configuration based on the user selection of one or more image effects and associated intensity values received by the user input module 110. For example, the preset configuration includes an identification of two image effects stored in the effects database 106 and an identification of associated intensity values for each. The preset configuration is representative of the user's desired appearance of the image after the selected image effects are applied to the image at magnitudes corresponding to the selected intensity values.

In some embodiments, after generating and storing a preset configuration based on the user selection of one or more image effects and associated intensity values, when the user subsequently selects the same one or more image effects and associated intensity values, the preset configuration module 112 accesses the previously generated and stored preset configuration. Likewise, in some embodiments, one or more previously generated and stored preset configurations can be displayed to a user (for instance, in a preset configuration interface along with information or an icon representative of the preset configuration), and in response to the selection of a displayed preset configuration by the user, the preset configuration module 112 accesses the corresponding stored preset configuration.

The LUT generator module 114 accesses LUTs stored in the LUT database 108 corresponding to a preset configuration and generates a combined LUT based on the intensity values identified by the preset configuration. The combined LUT corresponds to a desired appearance of the image with the two image effects identified by the preset configuration applied at magnitudes corresponding to the intensity values identified by the preset configuration. The LUT generator module 114 is described in further detail with regards to FIGS. 2A through 2C. The generated combined LUT can be stored in the LUT database 108 for subsequent use in processing images.

The LUT generator module 114 accesses LUTs stored in the LUT database 108 by identifying, for the image effects identified by the preset configuration, corresponding LUTs associated with intensity values closest (e.g., within a threshold proximity) to the intensity values identified by the preset configuration. For instance, if the preset configuration identifies a first image effect and an associated intensity value of "+0.6" and identifies a second image effect and an associated intensity value of "−1.2", the LUT generator module 114 can identify and access a set of LUTs each associated with the first and second image effects including:

A first LUT associated with an intensity value of "0" for the first image effect and an intensity value of "−2" for the second image effect;

A second LUT associated with an intensity value of "+1" for the first image effect and an intensity value of "−2" for the second image effect;

A third LUT associated with an intensity value of "0" for the first image effect and an intensity value of "−1" for the second image effect; and A fourth LUT associated with an intensity value of "+1" for the first image effect and an intensity value of "−1" for the second image effect.

Accordingly, the LUT generator module 114 accesses, for the image effects identified by the preset configuration, a set of up to 4 LUTs associated with the image effects and associated with intensity values closest to the intensity values identified by the preset configuration. The LUT generator module 114 generates the combined LUT by combining the accessed set of LUTs, for instance using interpolation. In some configurations, the LUT generator module 114 can combine the accessed set of LUTs by performing linear interpolation (e.g., a straight linear weighted average) between the accessed set of LUTs. In such embodiments, the LUT generator module 114 determines weights for use in the linear interpolation based on a proximity between the intensity values identified by the preset configuration and the intensity values associated with each LUT in the accessed set of LUTs, as described below. In other configurations, the LUT generator module 114 can combine the accessed set of LUTs using other mechanisms, such as nonlinear interpolation, non-weighted linear averages, and the like. It should be noted that although reference is made herein to the combination of LUTs associated with two image effects, in practice, LUTs associated with one, three, or more effects can be combined according to the principles described herein.

As noted above, in some configurations, the LUT generator module 114 stores generated combined LUTs in the LUT database 108. In these configurations, the LUT generator module 114, before generating a combined LUT corresponding to a preset configuration selected by a user, first determines whether the selected preset configuration corresponds to a combined LUT already stored in the LUT database 108. Responsive to the selected preset configuration not corresponding to a combined LUT already stored in the LUT database 108, the LUT generator module 114 generates a combined LUT based on the selected preset configuration as described above. Responsive to the selected preset configuration corresponding to a combined LUT already stored in the LUT database 108 (e.g., in response to the user selecting a preset configuration previously selected by the user and used to generated a combined LUT), the LUT generator module 114 accesses the stored combined LUT for use in processing an image. In such embodiments, the computing system 100 is able to process an image according to the selected preset configuration without having to re-generate a combined LUT, thereby reducing the amount of processing power required to process the image.

The image processing module 116 accesses and processes the image using the combined LUT generated by the LUT generator module 114 (or a previously generated combined LUT stored in the LUT database 108 and accessed by the LUT generator module 114). The image processing module 116 may process the image by applying the combined LUT to the image on a pixel-by-pixel basis, on a block-by-block basis, or to the entire image at once. For example, the image processing module 116 can query the combined LUT with each pixel value in the image, and can replace the queried pixel value with the output value mapped to the pixel value by the combined LUT. In this manner, the image processing module 116 applies the image effects identified by the preset configuration at magnitudes corresponding to the intensity values identified by the preset configuration (the user's desired appearance of the image) to the image, producing a processed image.

The output module 118 outputs the processed image, for instance by storing the processed image in the image database 104, by storing the processed image in a memory of a device implementing the computing system 100, or by uploading or otherwise outputting the processed image (for instance, to a cloud image server). In some embodiments, the output module 118 displays the image on a hardware display corresponding to the computing system 100, either at full resolution or at a preview resolution (for instance, by first processing a low-resolution version of the image using the combined LUT, enabling a user to preview what the selected preset configuration will look like when applied to the image, before applying the preset configuration to the full resolution image). The output module 118 may also perform format conversion operations, compression operations, and the like on the processed image before outputting the processed image.

By storing a limited set of LUTs associated with a set of image effects and generating a combined LUT based on the stored LUTs and image effects and associated intensity values identified by a preset configuration, the computing system 100 can beneficially reduce the total number of stored LUTs required to implement the set of image effects. In a first embodiment, for a first image effect corresponding to an intensity value range of −1 to +1, and a second image effect corresponding to an intensity value range of −2 to +2, storing LUTs corresponding to each integer combination of intensity values requires storing 15 total LUTs (3 LUTs for each of the intensity values "−1", "0", and "+1" for the first image effect multiplied by 5 LUTs for each of the values "−2", "−1", "0", "+1", and "+2" for the second image effect). In a second embodiment, storing LUTs corresponding to each tenth of an integer intensity value (e.g., "−1.0", "−0.9", . . . , "+0.9", "+1.0" for the first image effect, for a total of 21 LUTs multiplied by "−2.0", "−1.9", "−1.8", . . . , "+1.9", "+2.0" for the second image effect, for a total of 41 LUTs) requires storing 861 LUTs. Thus, by implementing the first embodiment and interpolating among the stored LUTs of the first embodiment to generate a combined LUT corresponding to intensity values at a tenth of an integer resolution, only 15/861=1.74% as much memory is required by the computing system 100 to implement the image processing described herein. Accordingly, the combination of LUTs described herein beneficially enables the computing system 100 to realize significant storage savings, among other benefits.

Example Combined Lookup Table Generation

FIG. 2A illustrates an example grid of LUTs 200 corresponding to combinations of intensity values for first and second image effects 202 and 204, according to one embodiment. The LUTs in the grid of LUTs 200 are linearly distributed along each axis (i.e., for each image effect). In some configurations, the LUTs in the grid of LUTs 200 are exponentially or otherwise distributed along each axis. A first axis 206 of the grid of LUTs 200 is associated with an intensity value range of the first effect 202 and a second axis 208 of the grid of LUTs 200 is associated with an intensity value range of the second image effect 204. Each LUT in the grid of LUTs 200 is stored in the LUT database 108, and is associated with a first intensity value corresponding to the first image effect 202 and a second intensity value corresponding to the second image effect 204. The number of LUTs in the grid of LUTs 200 is directly related to the range of intensity values for each of the first and second effects 202 and 204, and to the distribution of LUTs along each axis.

As illustrated in FIG. 2A, the first image effect 202 has an intensity value range from −1 to +1, the second image effect 204 has an intensity value range from −2 to +2, and the grid of LUTs 200 includes 15 LUTs (A1, A2, . . . , A5, B1, B2, . . . , B5, C1, C2, . . . , C5). For example, LUT A1 corresponds to a an intensity value of −1 for the first image effect 202 and an intensity value of −2 for the second image effect 204, LUT B1 corresponds to an intensity value of 0 for the first image effect and an intensity value of −2 for the second image effect, and so on.

FIG. 2B illustrates an example preset configuration p corresponding to a user input with respect to the grid of LUTs 200 of FIG. 2A, according to one embodiment. For instance, if the grid of LUTs 200 is displayed on a display of the computing system 100, the preset configuration p can correspond to a location within the displayed grid of LUTs 200 that a user touches. The preset configuration p includes an identification of the first and second image effects 202 and 204 and an identification of associated intensity values for each. In the example of FIG. 2B, the preset configuration p includes an identification of an intensity value of +0.6 for the first effect 202 and an identification of an intensity value of −1.2 for the second effect 204.

The LUT generator module 114 identifies and accesses corresponding LUTs in the grid of LUTs 200 associated with intensity values closest to (or within a threshold proximity of) the intensity values of +0.6 and −1.2 for the first and second effects 202 and 204, respectively, identified by the preset configuration p. As illustrated in FIG. 2B, the LUT generator module 114 identifies LUTs B1, B2, C1, and C2 as the LUTs with intensity values closest to the intensity values identified in the preset configuration p:

LUT B1 is associated with an intensity value of "0" for the first image effect 202 and an intensity value of "−2" for the second image effect 204;

LUT C1 is associated with an intensity value of "+1" for the first image effect 202 and an intensity value of "−2" for the second image effect 204;

LUT B2 is associated with an intensity value of "0" for the first image effect 202 and an intensity value of "−1" for the second image effect 204; and LUT C2 associated with an intensity value of "+1" for the first image effect 202 and an intensity value of "−1" for the second image effect 204.

It should be noted that in some embodiments, the LUT generator module 114 identifies a set of four LUTs associated with intensity values closest to the intensity values identified by the preset configuration p. For instance, the LUT generator module 114 can determine the distance between the location on the grid of LUTs 200 of the intensity values identified by the present configuration p and each LUT within the grid of LUTs 200 (based on the intensity values corresponding to each LUT). In such embodiments, the LUT generator module 114 selects the four LUTs corresponding to the shortest determined distances from the preset configuration p. It should also be noted that in other embodiments, the LUT generator module 114 can identify a set of LUTs including 2, 3, 5, 6, or more LUTs closest to the intensity values identified by the preset configuration p (e.g., based on the location of the LUTs and the intensity values identified by the present configuration p within the grid of LUTs 200). In some embodiments, the LUT generator module 114 can select all or some LUTs within a threshold proximity of the intensity values identified by the preset configuration p (e.g., based on the location of the LUTs and the intensity values identified by the present configuration p within the grid of LUTs 200).

Continuing with the example embodiment of FIG. 2B, the LUT generator module 114 determines a weight for each of the 4 LUTs identified by the LUT generator module 114 and based on the intensity values identified by the preset configuration p and the intensity values associated with the identified LUTs. In some embodiments, the LUT generator module 114 determines the weight for each identified LUT based on a proximity between the intensity values identified by the preset configuration p and the intensity values associated with the LUT. In some embodiments, the determined weights are between the values of 0.0 and 1.0, though in other embodiments, weights within other weight ranges can be determined according to the principles described herein.

In some embodiments, the shorter the distance between intensity values associated with a LUT and the intensity values identified by the preset configuration p, the greater the weight, and vice versa (in other words, the distance between the intensity values associated with a LUT and the intensity values identified by the preset configuration p is inversely proportional to the weight determined for the LUT). In the example illustrated in FIG. 2B, the LUT generator module 114 determines weights w1, w2, w3, and w4 for LUTs B1, B2, C1, and C2, respectively. In this example, weight w4 is greater than weight w2 (since LUT C2 is closer to the preset configuration p than LUT B2), which is greater than weight w3 (since LUT B2 is closer to the preset configuration p than LUT C1), which is greater than weight w1 (since LUT C1 is closer to the preset configuration p than LUT B1).

The LUT generator module 114 generates a combined LUT based on the identified LUTs and the determined weights. As noted above, the combined LUT can be generated based on an average of the identified LUTs, weighted using the determined weights. FIG. 2C illustrates an example formula for generating the combined LUT based on the 4 LUTs B1, B2, C1, and C2, and the associated weights w1, w2, w3, and w4. As illustrated in FIG. 2C, the combined LUT is generated by weighting the LUTs B1, B2, C1, and C2. For instance, LUT B1 is weighted with the weight w1 (e.g., by multiplying the entries of LUT B1 by the weight w1), LUT B2 is weighted with the weight w2, LUT C1 is weighted with the weight w3, and LUT C2 is weighted with the weight w4. The weighted LUTs are then averaged—as the embodiment of FIG. 2C includes four weighted LUTs, the weighted LUTs are summed and then divided by 4. For instance, the values of corresponding entries of the weighted LUTs can be added together and then divided by the value of 4. The combined LUT, when applied to an image during image processing, corresponds to a desired appearance of the image with the first and second image effects 202 and 204 applied at magnitudes corresponding to intensity values of +0.6 for the first effect 202 and −1.2 for the second effect 204 as identified in the preset configuration p.

Example System Flow

Figure 3:
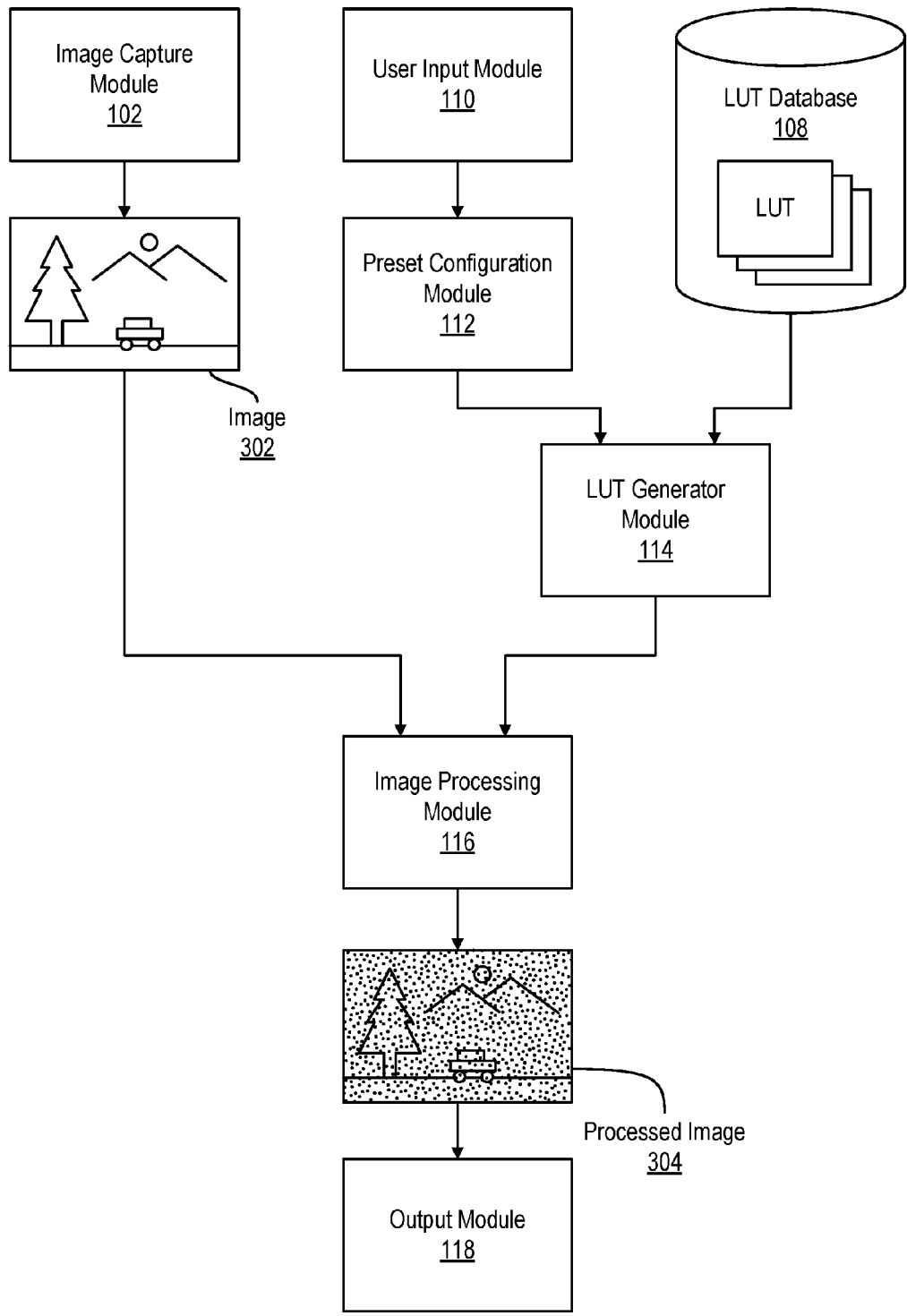
FIG. 3 illustrates an example flow diagram for capturing an image, generating a combined lookup table based on user input, and applying the combined lookup table to the captured image, according to one embodiment.

FIG. 3 illustrates an example flow diagram 300 for capturing an image, generating a combined LUT based on user input, and applying the combined lookup table to the captured image, according to one embodiment.

The image capture module 102 captures an image 302. The user input module 110 receives user input corresponding to a user's desired appearance of the image 302 including a selection of two image effects and associated intensity values for each image effect. The preset configuration module 112 generates and stores a preset configuration based on the user selection of the two image effects and associated intensity values received by the user input module 112. The preset configuration identifies the two image effects stored in the effects database 106 and the associated intensity values for each identified image effect. The LUT generator module 114 accesses LUTs stored in the LUT database 108 corresponding to the preset configuration generated by the preset configuration module 112 and generates a combined LUT based on the intensity values identified by the preset configuration. The image processing module 116 accesses and processes the image 302 using the combined LUT generated by the LUT generator module 114 and outputs a processed image 304 via the output module 118.

Example Flow Chart

Figure 4:
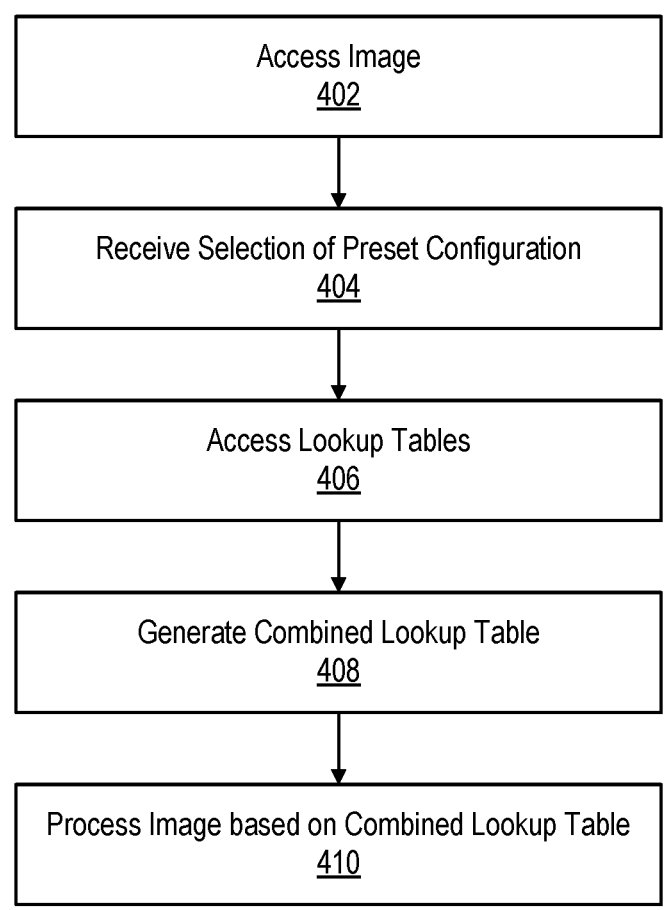
FIG. 4 illustrates a flow diagram illustrating a process of generating a combined lookup table, according to one embodiment.

FIG. 4 illustrates a flow diagram illustrating a process of generating a combined LUT, according to one embodiment. An image is accessed 402, for instance by capturing the image via an image sensor chip, or accessing a previously captured image stored in memory. A selection of a preset configuration is received 404, for instance from a user of the image processing system. The preset configuration identifies a set of image effects (such as one, two, or more image effects), and an intensity value corresponding to each identified image effect. In some embodiments, the preset configuration is generated based on a user selection of image effects and corresponding intensity values.

A set of LUTs is accessed 406 based on the preset configuration. For instance, each LUT in the set of accessed LUTs corresponds to each selected image effect. In some embodiments, each LUT in the set of accessed LUTs is associated with intensity values corresponding to each selected image effect that are within a threshold proximity of the intensity values identified by the preset configuration. A combined LUT is generated 408 based on the accessed set of LUTs. In some embodiments, a weight is generated for each LUT in the accessed set of LUTs based on a proximity or distance between the intensity values associated with the LUT and the intensity values identified by the preset configuration. The combined LUT can then be generated by computing an average of the accessed set of LUTs weighted by the generated weights corresponding to each LUT. The accessed image is then processed 410 using the combined LUT.

Additional Considerations

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Any of the devices or systems described herein can be implemented by one or more computing devices. A computing device can include a processor, a memory, a storage device, an I/O interface, and a communication interface, which may be communicatively coupled by way of communication infrastructure. Additional or alternative components may be used in other embodiments. In particular embodiments, a processor includes hardware for executing computer program instructions by retrieving the instructions from an internal register, an internal cache, or other memory or storage device, and decoding and executing them. The memory can be used for storing data or instructions for execution by the processor. The memory can be any suitable storage mechanism, such as RAM, ROM, flash memory, solid state memory, and the like. The storage device can store data or computer instructions, and can include a hard disk drive, flash memory, an optical disc, or any other suitable storage device. The I/O interface allows a user to interact with the computing device, and can include a mouse, keypad, keyboard, touch screen interface, and the like. The communication interface can include hardware, software, or a combination of both, and can provide one or more interfaces for communication with other devices or entities.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product including a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may include a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may include information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments herein is intended to be illustrative, but not limiting, of the scope of the disclosure, which is set forth in the following claims.

What is claimed is:

1. A client device comprising a non-transitory computer-readable storage medium storing executable instructions that, when executed by a processor, are configured to perform steps comprising:
   accessing an image to be processed;
   receiving a selection of a first image effect and a corresponding first intensity value and a selection of a second image effect and a corresponding second intensity value;
   accessing a combined lookup table generated based on 1) a first set of lookup tables selected based on the selected first image effect and the corresponding first intensity value, and 2) a second set of lookup tables selected based on the selected image effect and the corresponding second intensity value;
   processing the accessed image using the combined lookup table to produce a processed image; and
   outputting the processed image.

2. The client device of claim 1, wherein one or both of the first image effect and the second image effect comprise one or both of an effect emulating analog film scanner warmth and an effect emulating analog film exposure time.

3. The client device of claim 1, wherein accessing the image to be processed comprises capturing the image by the client device.

4. The client device of claim 1, wherein the combined lookup table is generated by:
   determining a weight for each lookup table in the first set of lookup tables and the second set of lookup tables; and
   interpolating the first set of lookup tables and the second set of lookup tables by computing a weighted average of the first set of lookup tables and the second set of lookup tables based on the determined weights.

5. The client device of claim 4, wherein each weight is determined based on a proximity of intensity value associated with a lookup table of the first set of lookup tables or the second set of lookup tables to one of the first intensity value or the second intensity value.

6. The client device of claim 1, wherein the combined lookup table is received from a device external to the client device.

7. The client device of claim 1, wherein the combined lookup table is received from an application running on the client device.

8. A method comprising:
   accessing, by a client device, an image to be processed;
   receiving, by the client device, a selection of a first image effect and a corresponding first intensity value and a selection of a second image effect and a corresponding second intensity value;
   accessing, by the client device, a combined lookup table generated based on 1) a first set of lookup tables selected based on the selected first image effect and the corresponding first intensity value, and 2) a second set of lookup tables selected based on the selected image effect and the corresponding second intensity value;
   processing, by the client device, the accessed image using the combined lookup table to produce a processed image; and
   outputting, by the client device, the processed image.

9. The method of claim 8, wherein one or both of the first image effect and the second image effect comprise one or both of an effect emulating analog film scanner warmth and an effect emulating analog film exposure time.

10. The method of claim 8, wherein accessing the image to be processed comprises capturing the image by the client device.

11. The method of claim 8, wherein the combined lookup table is generated by:
    determining a weight for each lookup table in the first set of lookup tables and the second set of lookup tables; and
    interpolating the first set of lookup tables and the second set of lookup tables by computing a weighted average of the first set of lookup tables and the second set of lookup tables based on the determined weights.

12. The method of claim 11, wherein each weight is determined based on a proximity of intensity value associated with a lookup table of the first set of lookup tables or the second set of lookup tables to one of the first intensity value or the second intensity value.

13. The method of claim 8, wherein the combined lookup table is received from a device external to the client device.

14. The method of claim 8, wherein the combined lookup table is received from an application running on the client device.

15. A non-transitory computer-readable storage medium storing executable computer instructions that, when executed by a processor, perform steps comprising:
    accessing, by a client device, an image to be processed;
    receiving, by the client device, a selection of a first image effect and a corresponding first intensity value and a selection of a second image effect and a corresponding second intensity value;
    accessing, by the client device, a combined lookup table generated based on 1) a first set of lookup tables selected based on the selected first image effect and the corresponding first intensity value, and 2) a second set of lookup tables selected based on the selected image effect and the corresponding second intensity value;
    processing, by the client device, the accessed image using the combined lookup table to produce a processed image; and
    outputting, by the client device, the processed image.

16. The non-transitory computer-readable storage medium of claim 15, wherein one or both of the first image effect and the second image effect comprise one or both of an effect emulating analog film scanner warmth and an effect emulating analog film exposure time.

17. The non-transitory computer-readable storage medium of claim 15, wherein accessing the image to be processed comprises capturing the image by the client device.

18. The non-transitory computer-readable storage medium of claim 15, wherein the combined lookup table is generated by:
    determining a weight for each lookup table in the first set of lookup tables and the second set of lookup tables; and
    interpolating the first set of lookup tables and the second set of lookup tables by computing a weighted average of the first set of lookup tables and the second set of lookup tables based on the determined weights.

19. The non-transitory computer-readable storage medium of claim 18, wherein each weight is determined based on a proximity of intensity value associated with a lookup table of the first set of lookup tables or the second set of lookup tables to one of the first intensity value or the second intensity value.

20. The non-transitory computer-readable storage medium of claim 15, wherein the combined lookup table is received from a device external to the client device, or from an application running on the client device.

* * * * *